US012664225B2

(12) United States Patent
Bair

(10) Patent No.: US 12,664,225 B2
(45) Date of Patent: Jun. 23, 2026

(54) METHOD AND SYSTEM FOR ENABLING MEDIA PLAYBACK AND DISPLAY VIA QR CODE

(71) Applicant: Scott Bair, Camarillo, CA (US)

(72) Inventor: Scott Bair, Camarillo, CA (US)

( * ) Notice: Subject to any disclaimer, the term of this patent is extended or adjusted under 35 U.S.C. 154(b) by 0 days.

(21) Appl. No.: 18/200,149

(22) Filed: May 22, 2023

(65) Prior Publication Data

US 2025/0181663 A1 Jun. 5, 2025

(51) Int. Cl.
*G06F 16/955* (2019.01)
*G06K 7/14* (2006.01)

(52) U.S. Cl.
CPC ....... *G06F 16/9554* (2019.01); *G06K 7/1417* (2013.01)

(58) Field of Classification Search
CPC .......................... G06F 16/9554; G06K 7/1417
USPC ................................................ 235/494, 487
See application file for complete search history.

(56) References Cited

U.S. PATENT DOCUMENTS

| | | | | |
|---|---|---|---|---|
| 9,805,356 | B2 * | 10/2017 | Jewell | .................. G06Q 20/208 |
| 11,334,779 | B1 * | 5/2022 | Schwarzberg | ... G06K 19/06037 |
| 11,599,757 | B1 * | 3/2023 | Daugherty | .......... G06F 16/9554 |
| 2013/0036635 | A1 * | 2/2013 | Mayer | ...................... G09F 9/30 |
| | | | | 40/124.06 |
| 2014/0319209 | A1 * | 10/2014 | Beadles | ............ G06Q 30/0207 |
| | | | | 235/494 |
| 2019/0303634 | A1 * | 10/2019 | Broselow | ......... G06K 19/06028 |
| 2022/0245671 | A1 * | 8/2022 | Heeter | .................. H04W 12/77 |
| 2022/0327303 | A1 * | 10/2022 | Carlson | ................ G06K 7/1434 |
| 2022/0398289 | A1 * | 12/2022 | Armstrong | .......... G06F 16/9558 |
| 2022/0414251 | A1 * | 12/2022 | Wechsler | ........... G06F 21/6218 |
| 2024/0060235 | A1 * | 2/2024 | Strehl, Jr. | ........... G06K 19/027 |

* cited by examiner

*Primary Examiner* — Paultep Savusdiphol
(74) *Attorney, Agent, or Firm* — The Rapacke Law Group, P.A.

(57) ABSTRACT

The present disclosure relates to a computer program product and platform for enhancing the storytelling experience by enabling users to access media recordings associated with printed or digital content via QR codes or hyperlinks. The system may be configured to generate custom books using an online book builder tool and generate a unique QR code for each photo or content element in the book. The QR code, once read, executes a local version of the computer program product or webpage including an media recording that provides additional information or context about the photos or content elements.

20 Claims, 13 Drawing Sheets

METHOD AND SYSTEM FOR ENABLING MEDIA PLAYBACK AND DISPLAY VIA QR CODE

TECHNICAL FIELD

The embodiments generally relate to computerized systems or computer program products relating to image, video, audio, or media playback on a computing device via QR code.

BACKGROUND

Storytelling or sharing of memories, through digital or printed text and images, lacks media elements that may otherwise enhance the experience.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments generally relate to a software-as-a-service (SaaS) platform configured to pair QR codes and pictures in a publication with a media experience delivered via a computer program product or application program. The disclosed platform may receive uploaded pictures and media files, such as via a computing device, and generate QR codes tagged to be associated with each of the pictures or media files.

The platform may publish QR codes and pictures on printed or online materials, such as to a webpage in operable communication with the platform over a network. A user device, such as a smart device or computing device with QR code-reading functionality, may be utilized to read or scan the QR-code, execute an instance of the computer program product locally on the user device, and display pictures or playback media files. The platform may also facilitate printing of a book or similar matter containing the images, text, and corresponding QR codes.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
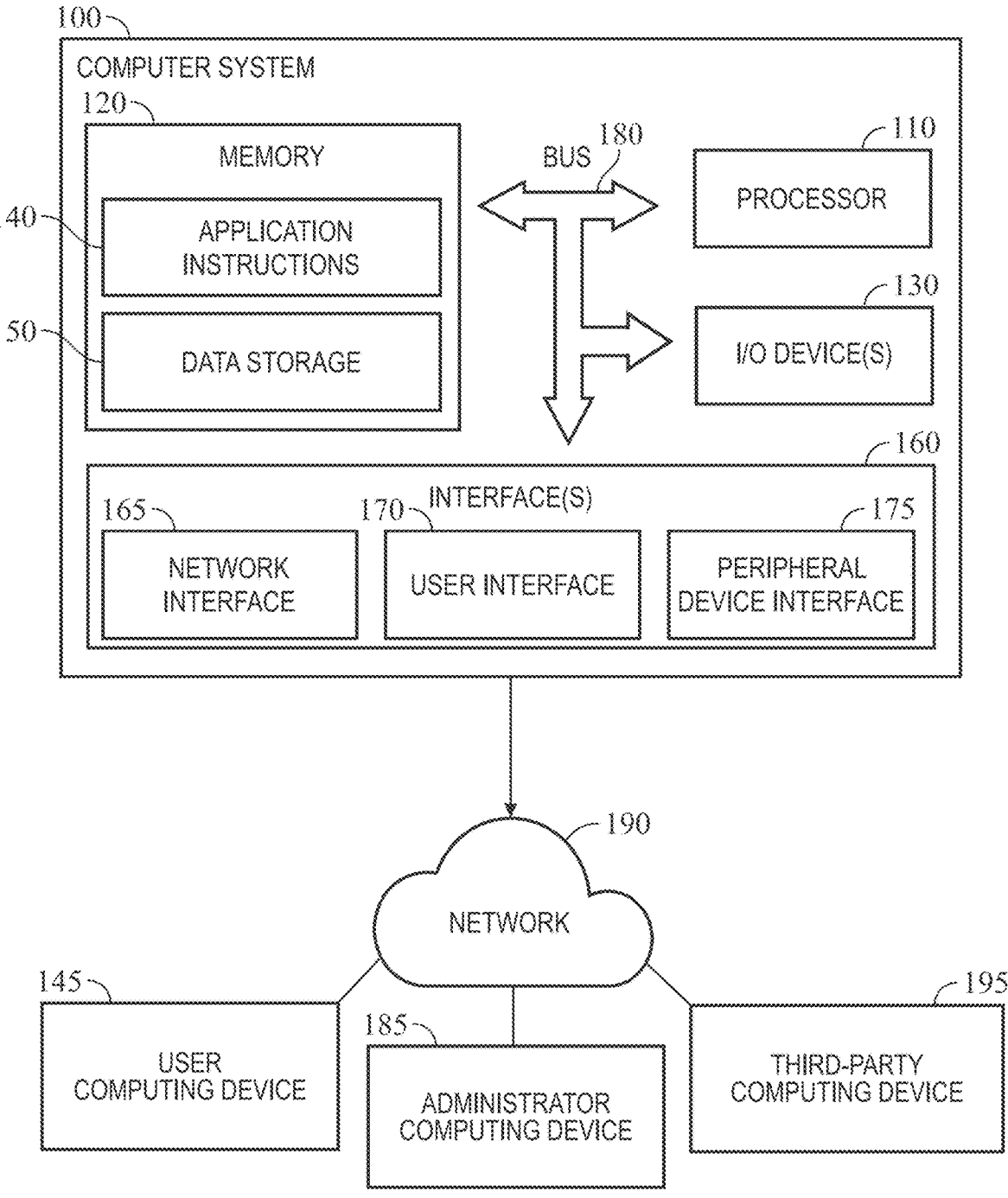
FIG. 1 illustrates a block diagram of a computing system, according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

As used herein, the term "user" may be utilized to relate to any user of the system including. individuals accessing the system. "User" may also refer to administrator users and the like.

As used herein, the term "book" and variations on that term may refer to digital or physical versions of documents, books, magazines, brochures, product catalogs, travel, promotional materials, frames, plaques, prints, postcards, greeting cards, framed photos, or plaques, among others.

As used herein, the term "media" and variations on that term may refer to video recordings, audio records, image data, text data, and combinations of the same.

The embodiments generally relate to a software-as-a-service (SaaS) platform configured to automatically to generate and read QR codes, or similar scannable codes such as a barcode, from printed matter, such as a book, to enable playback of media associated with the QR code. Similarly, the platform may be configured to enable display of images or data associated with the QR code.

According to some embodiments, the platform may facilitate the creation of books, such as photo albums, whereby a user may upload photos to the platform and arrange the photos in a general format similar to a book. The platform may allow a user to add text, such as captions, to photos, or additional text or information. The platform may generate QR code(s) associated with each of the photos or text or both and position the QR code approximately near the relevant photo or text within the general format similar to a book. The platform may additionally record media, via a computing device, and associate the media with an existing QR code or newly generated QR code specific to the media recording. The images, text, QR codes, and media may be assembled into a digital book. The images, text, and QR codes may be printed as a physical book. In use, a computing device such as a smart phone may be used to scan or read the QR codes within the book, and the platform may playback the media recording associated with the QR code and images and text.

The disclosed platform may be configured to generate a unique QR code associated with any of stored image data, informational data such as text, or media data uploaded by a computing device to the platform. Using a computing device, such as a smart phone, the unique QR code may be scanned or read and the system may generate a webpage to the stored image data, informational data such as text, or video or media data. The generated webpage may be displayed on the computing device having scanned or read the QR code and may instruct the computing device to playback media data via integrated media playback hardware, such as speakers.

Additionally, using a computing device, the unique QR code may be scanned or read, and the system may generate a hyperlink specific to the stored image data, informational, or video or audio data. Stored image data, informational, or video or audio data may be stored in a database as a data set all of which are associated with the unique QR code. The QR code may include a tag associated with the relevant data set, such that upon reading of the QR code, the platform utilizes the tag to locate the relevant data set and generate a hyperlink to the data set or a webpage displaying the data set. The system may communicate the hyperlink to a computing device such as via a user-selectable link. According to some embodiments, the hyperlink may automatically redirect a computing device to a webpage, and the platform may instruct the computing device to playback media data via integrated media playback hardware, such as speakers, and may instruct the computing device to display the stored image data or informational data on the computing device display.

According to some embodiments, the platform may include a local computer program product executable on a computing device, and which may be in operable communication with the platform, which may be executed, for example, on a server in operable communication with a network such that the platform and local computer program product are in operable communication with one another. The local computer program product may be configured to enable QR code reading, and upon reading a QR code, may request stored image data, informational, or video or audio data from the platform, which may be communicated to the local computer program product and computing device over the network. The local computer program product may initiate display or playback of the image data, informational, or video or audio data locally from storage on the computing device or over the network from the platform server.

According to embodiment, the platform may provide an enhanced reading experience of a book, photo album, digital book or album, or the like, by providing users with access to media recordings associated with content within the book, such as printed photo, plaques, or similar.

The system allows users to create custom books using an online book builder tool and corresponding graphical user interface (GUI) that provides an intuitive interface for adding text, photos, and other content elements to printed matter. Once the printer matter is created, the system generates a unique QR code for each photo or content element in the book. This may include single QR codes specific to an image and caption, or image alone, or text alone.

The QR code may include a link, or be linked, to an media recording that provides additional information or context about the content. Users can scan the QR code using their mobile devices or enter the associated URL to launch a system generated web page that enables them to listen to or view the media recording. The system allows users to create custom media recordings and the system automatically associates the recordings or content with specific QR codes, providing a high degree of flexibility and customization.

In addition to books, the system can be used with any printed product that contains photos or other content elements. For example, it can be used with product catalogs, travel brochures, promotional materials, frames, plaques, or prints, among others. The system provides a unique way of engaging users and enhancing their experience with physical content and it has numerous potential applications in a wide range of industries.

The platform may include a variety of account types configured to access the platform including, but not limited to, primary account holders and collaborator account holders. Primary account holders may upload information such as photos, text, or other information. Primary account holders may send digital invitations to other users to join a particular account or project as a collaborator, allowing multiple individuals to upload information such as photos, text, or other information to the system such that a photo book, book, magazine, brochure, or the like may be designed.

FIG. 1 illustrates an example of a computer system 100 that may be utilized to execute various procedures, including the processes described herein. Computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor (s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized to establish credentials, create a user profile, and otherwise interact with the various property management and real estate investment functionalities of the system. The third-party computing device 195 may be utilized by third parties to receive communications from the user computing device and/or administrative computing device 185.

Figure 2:
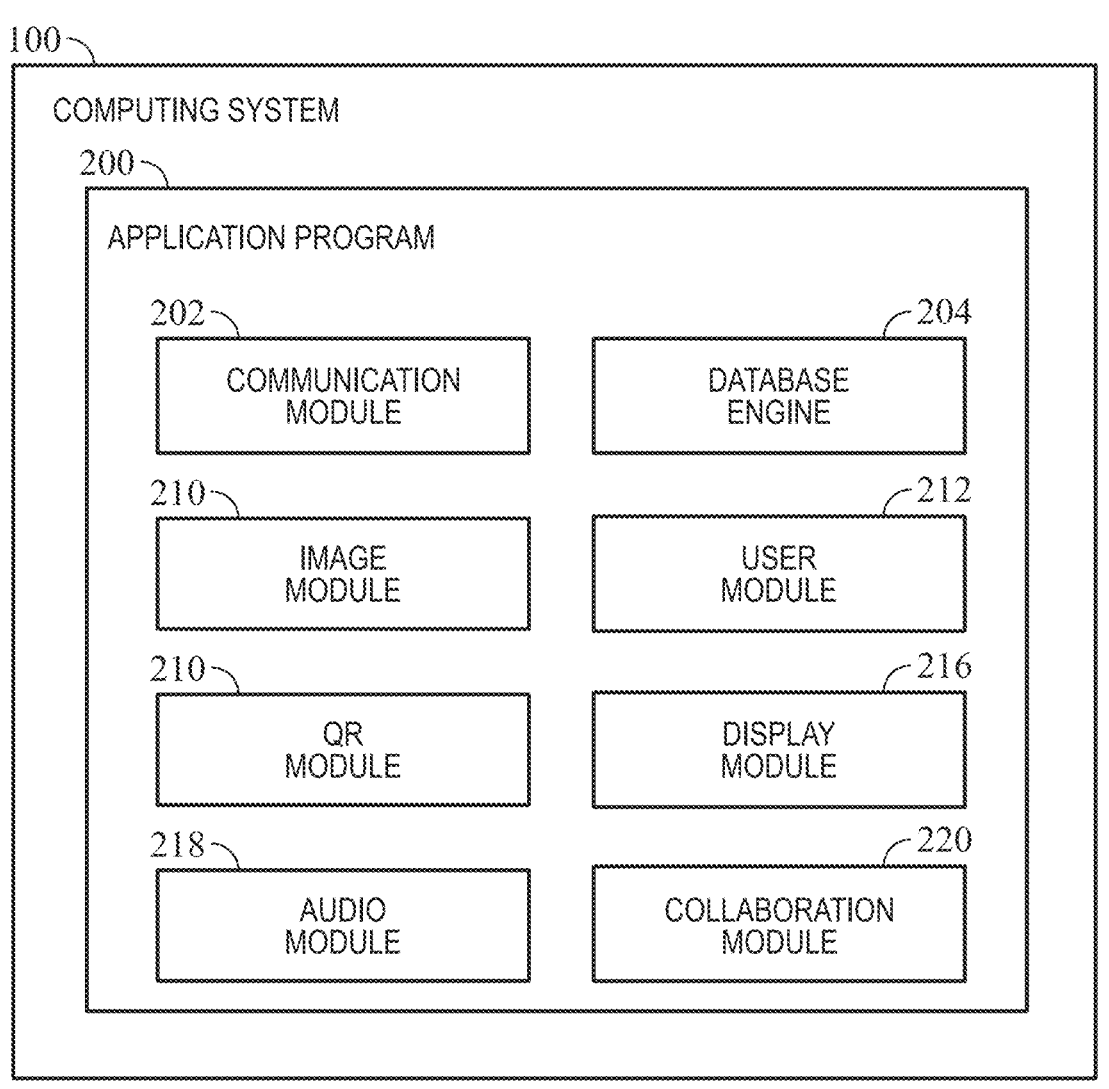
FIG. 2 illustrates a block diagram of a computing system and an application program, according to some embodiments.

FIG. 2 illustrates an example computer architecture for the application program 200 operated via the computing system 100. Computer system 100 comprises several modules and engines configured to execute the functionalities of the application program 200, and a database engine 204 configured to facilitate how data is stored and managed in one or more databases, such as cloud-based storage. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of a communication module 202, a database engine 204, an image module 210, a user module 212, a QR module 210, a media module 218, a collaboration module 220, and a display module 216.

In some embodiments, the communication module 202 is configured for receiving, processing, and transmitting a user command and/or user input. In such embodiments, the communication module 202 performs communication functions between various devices, including a user computing device 145, an administrator computing device 185, and a third-party computing device 195. In some embodiments, the communication module 202 is configured to allow one or more users of the system, including a third-party, to communicate with one another. In some embodiments, the communications module 202 is configured to maintain one or more communication sessions with one or more servers, the administrative computing device 185, and/or one or more third-party computing device(s) 195. In some embodiments, the communication module 202 allows each user to transmit and receive information which may be used by the system. The communication module 202 is operable to transmit alerts and notifications to secondary user devices as described hereinabove.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations. The database engine 204 allows each user and module associated with the system to transmit and receive information stored in various databases. The database module may be configured to facilitate the storage, management, and retrieval of the images, text, QR codes, and audio recordings utilized by the system.

Figure 6:
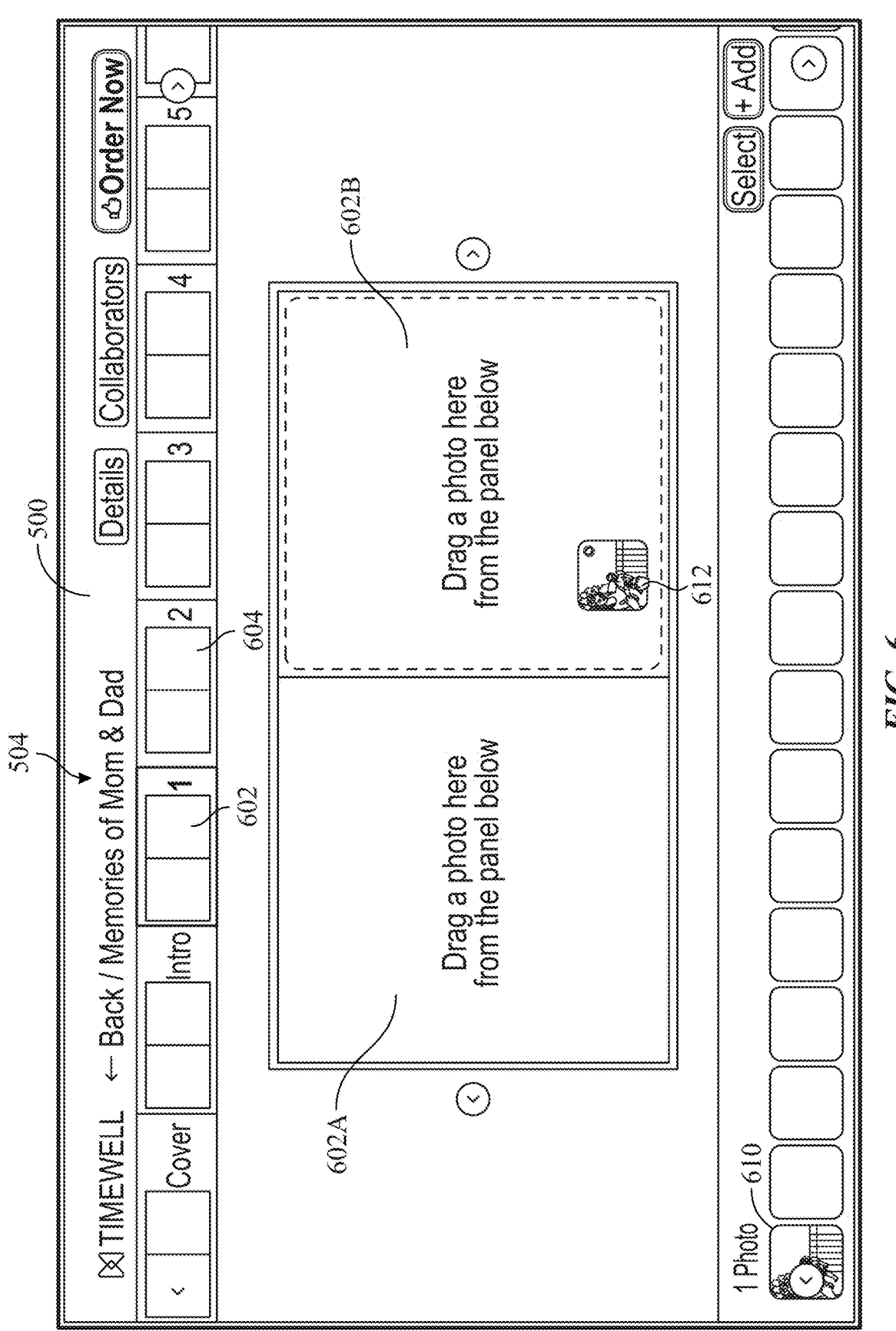
FIG. 6 illustrates a GUI a computing system and an application program, according to some embodiments.
Figure 9:
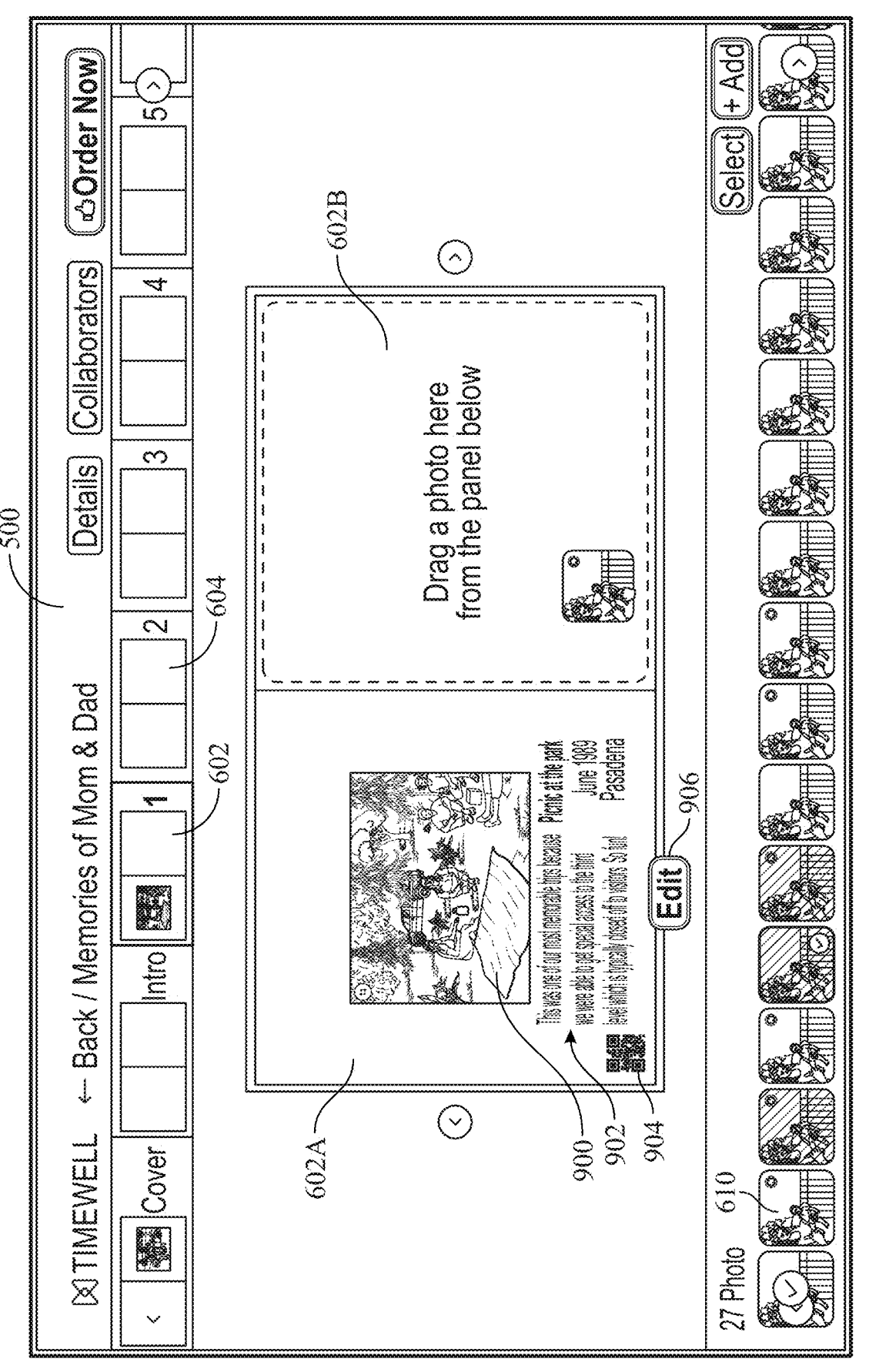
FIG. 9 illustrates a GUI a computing system and an application program, according to some embodiments.
Figure 10:
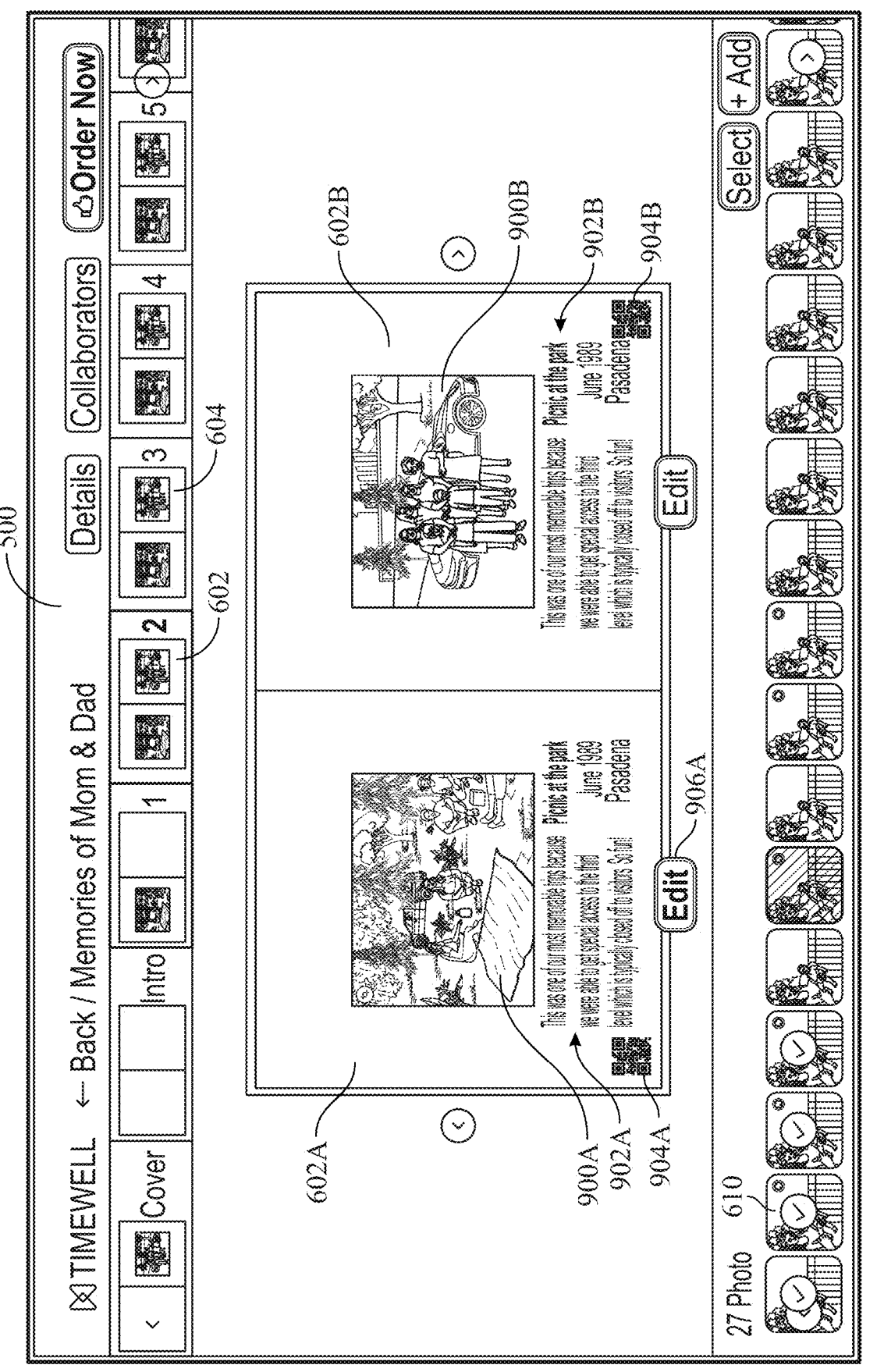
FIG. 10 illustrates a GUI a computing system and an application program, according to some embodiments.

In some embodiments, the image module 210 may be configured to receive and store image data, or store and transmit image data between computing devices or databases in operable communication with one another over a network. The image module 210, in conjunction with the display module 216, may be configured to allow users to design digital or print books using drag-and-drop functionality, as depicted in FIGS. 6, 9, and 10.

In some embodiments, the user module 212 facilitates the creation of a user account for the application system. The user module 212 may allow the user to input account information, user preferences, and the like. Primary user accounts may upload, download, and otherwise store images, text, or audio recording data in a database in operable communication with the system. The user module 212 may permit for primary and collaborator users. Primary account holders may upload information such as photos, text, or other information. Primary account holders may send digital invitations to other users to join a particular account or project as a collaborator, allowing multiple individuals to upload information such as photos, text, or other information to the system such that a photo book, book, magazine, brochure, or the like may be designed.

In some embodiments, the display module 216 is configured to display one or more GUIs, including, e.g., one or more user interfaces or one or more consumer interfaces. In some embodiments, the display module 216 is configured to temporarily generate and display various pieces of information in response to one or more commands or instructions, such as instructions to upload images, text, or video or audio recording data, or instructions to playback media recordings or display image or text data. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed via the display module 216 may not be persistently stored.

The QR module 214 may be configured to generate QR code(s) associated with each of the images or text or both and position the QR code approximately near the relevant photo or text within the general format of a book, as displayed in a GUI. The QR module 214 may be configured to insert at least one image and at least one media recording into a first dataset. The QR module 214 may be configured to generate at least one QR code unique to the first dataset and instruct, upon reading the at least one QR code, a computing device to initiate media playback of the at least one media recording on the computing device and display of the at least one image on a display of the computing device. Similarly, text data may be inserted into a dataset such that when a QR code is read, the QR module 214 may instruct a computing device to display the text data on a display of the computing device.

The media module 218 may be configured to record media, via a computing device, store the media in a database, and associate the media with an existing QR code or newly generated QR code specific to the media recording, image, and text. Media recordings, images, and text may be inserted into a dataset associated with a specific QR code. The media module 218 may be configured to communicate media recording data to a computing device when the system instructs the computing to do so, such as when the QR code is read via smart phone.

Figure 3:
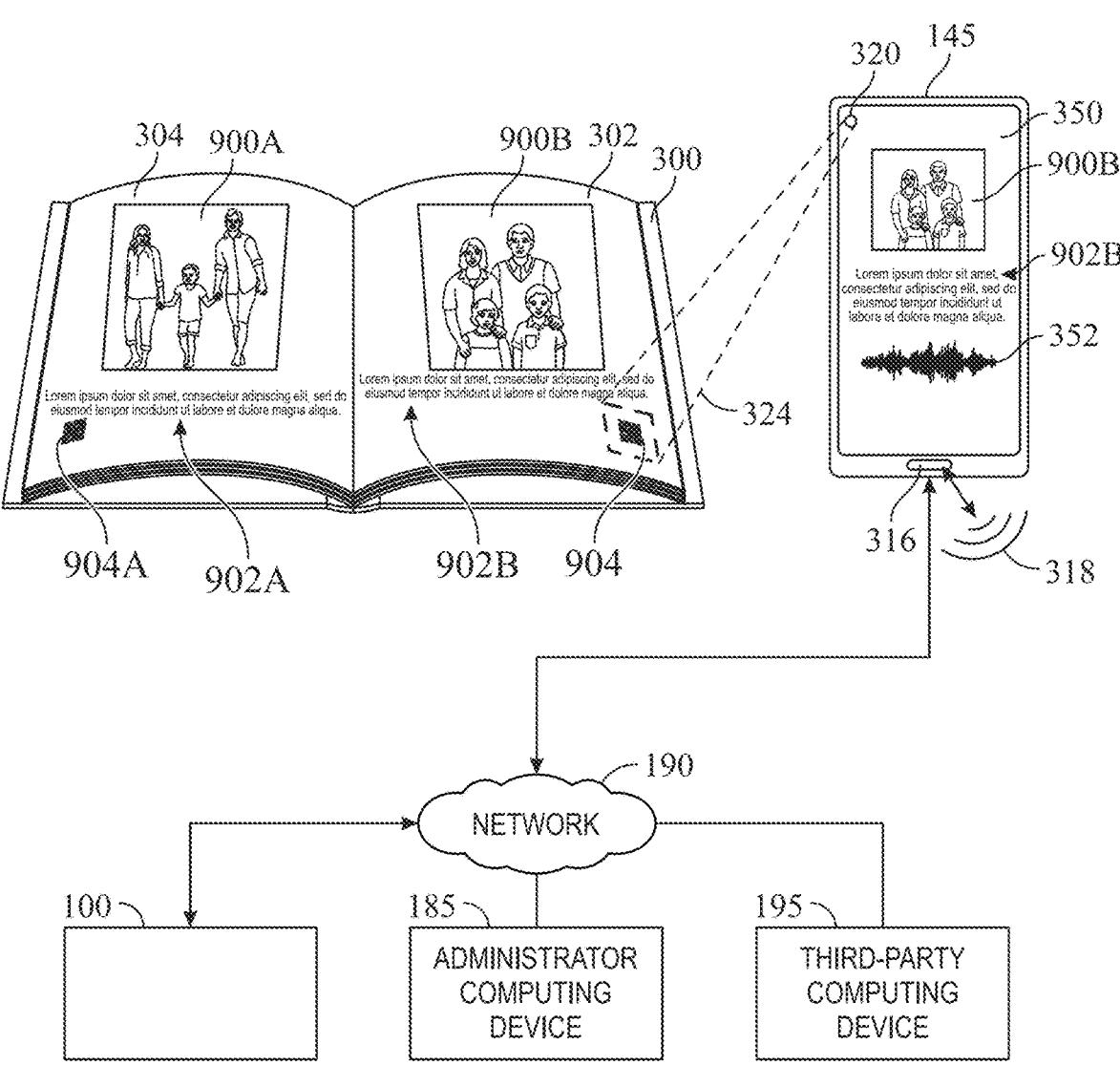
FIG. 3 illustrates a diagram of a computing system and an application program, according to some embodiments.

Referring to FIG. 3, an example of the disclosed system is shown, including a computer system 100 that may include a user computing device 145, an administrator computing device 185 and a third-party computing device 195 each in communication via the network 190. A user computing device 145 in operable communication with the network 190 may include a speaker 316 and camera 320 as well as display 350. The camera 320 may be configured to read 324 QR codes 904A, 904B in a printed or digital book 300. The book 300 may include a first image 900A, and first text 902 associated with the first image 900A on a first page 304. A first QR code 904 A may link to a webpage or data set including the first image 900A and first text 902A. The book 300 may include a second image 900B, and second text 902 B associated with the second image 900B on a second page 302. A second QR code 904 B may link to a web page or data set including the second image 900B and second text 902 B, both of which may be displayed on the display 350 upon reading of the second bar code 904 B. Similarly, upon reading of the second QR code 904 B, the system may instruct the smart device 104 to initiate playback 318 of a pre-recorded media recording 352 over a speaker device 316.

Figure 4:
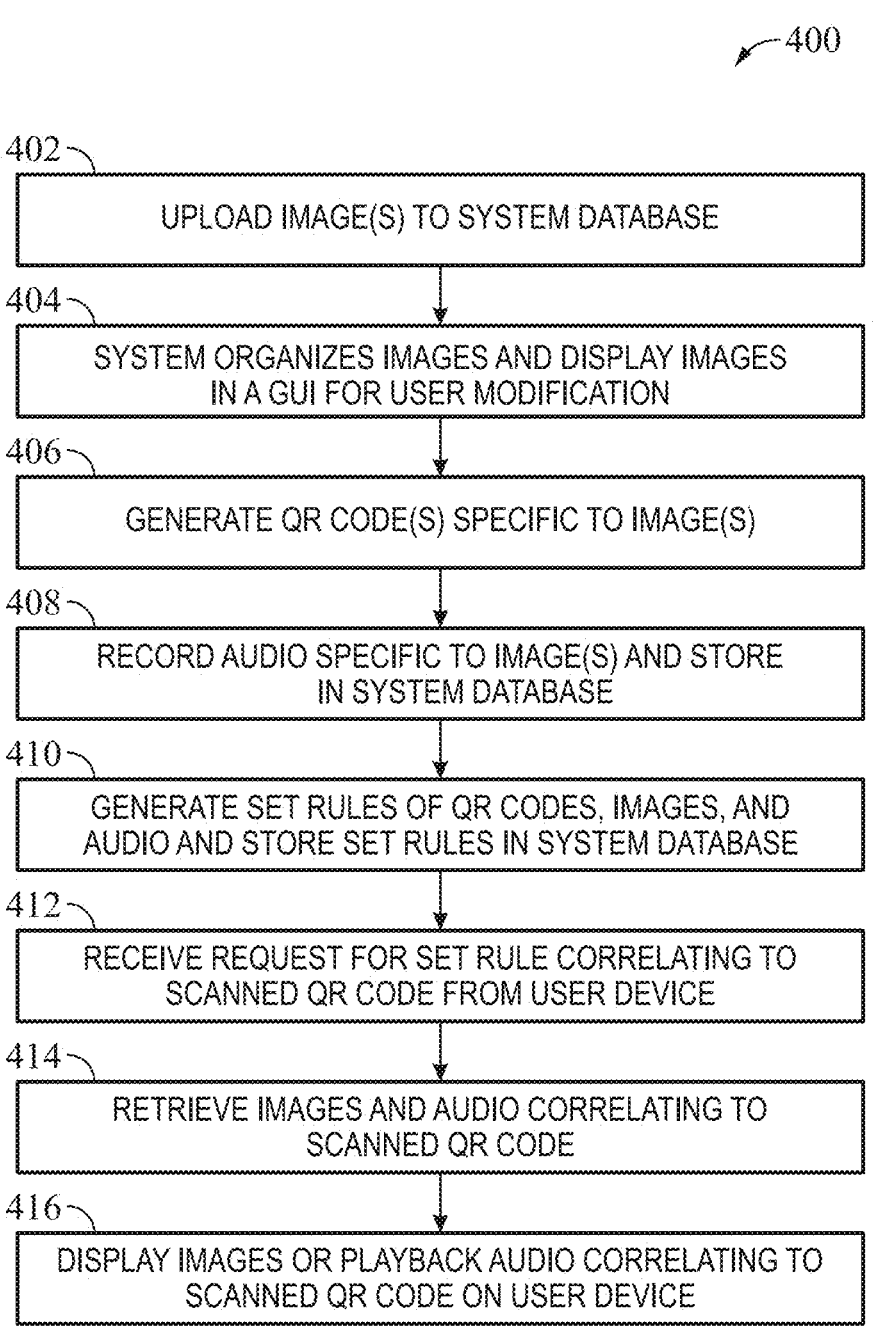
FIG. 4 illustrates a flowchart of a use case utilizing a computing system and an application program, according to some embodiments.

Referring to FIG. 4, an example of a method of utilizing the disclosed system is shown. The method 400 may include a first action 402 of uploading images to the system database, a second action 404 of systematically organizing images in a book format in a GUI enabling user editing, and a third action 406 of generating QR codes specific to the organized images. A fourth action 408 may include recording user media to be inserted into a data set with the uploaded images. According to action 410, recorded media and uploaded images may be inserted into data sets, each data set having a specific associated QR code. In action 412, a computing device may be used to read a QR code and communicate a request to the system to retrieve the data set associated with the read QR code. In action 414 the system may retrieve the data set associated with the read QR code and communicate the data set to the computing device. In step 416, the system may instruct the computing device to display the images within the communicated data set or initiate media playback of the recorded media in the data set.

Figure 5:
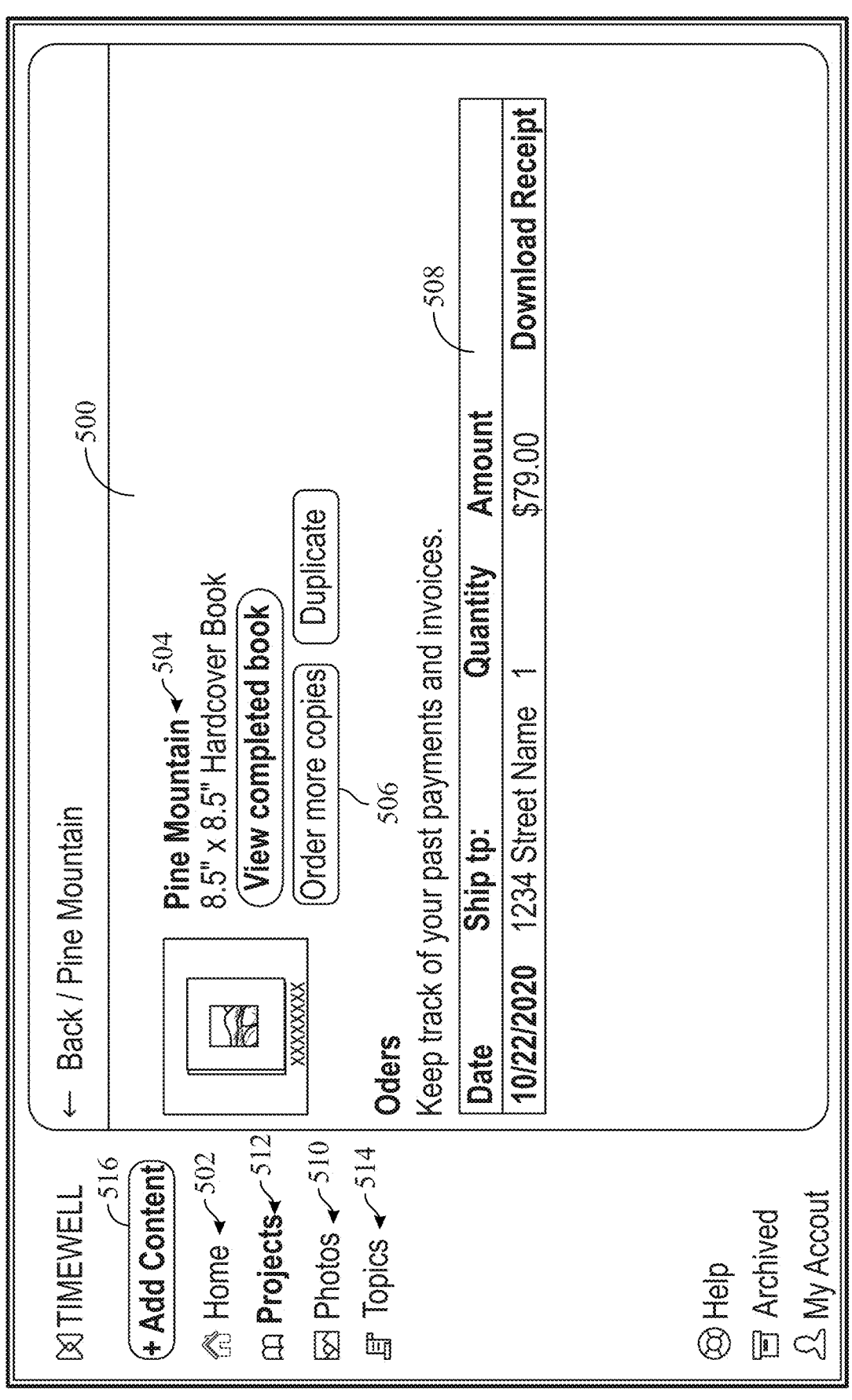
FIG. 5 illustrates a GUI a computing system and an application program, according to some embodiments.

Referring to FIG. 5, an example of a GUI provided to a computing device by the system is shown. The GUI 500 may be a web-based interface or local computing device interface providing a means to create digital books for digital or print. The GUI 500 may provide a means for creating projects 504 including ordering 506 of copies and order history 506. The GUI 500 may include a primary dashboard 502, project management 512, photo database 510, and topic sorting 514. The GUI 500 may be configured to facilitate upload of content 516 such as images or text.

Referring to FIG. 6, an example of a GUI provided to a computing device by the system is shown. The GUI 500 may provide a means for project 504 creation and editing include preparing of a book including multiple pages 602A, 602B. Uploaded images 610 may be sorted, filtered, and arranged within a project or book via drag-and-drop functionality.

Figure 7:
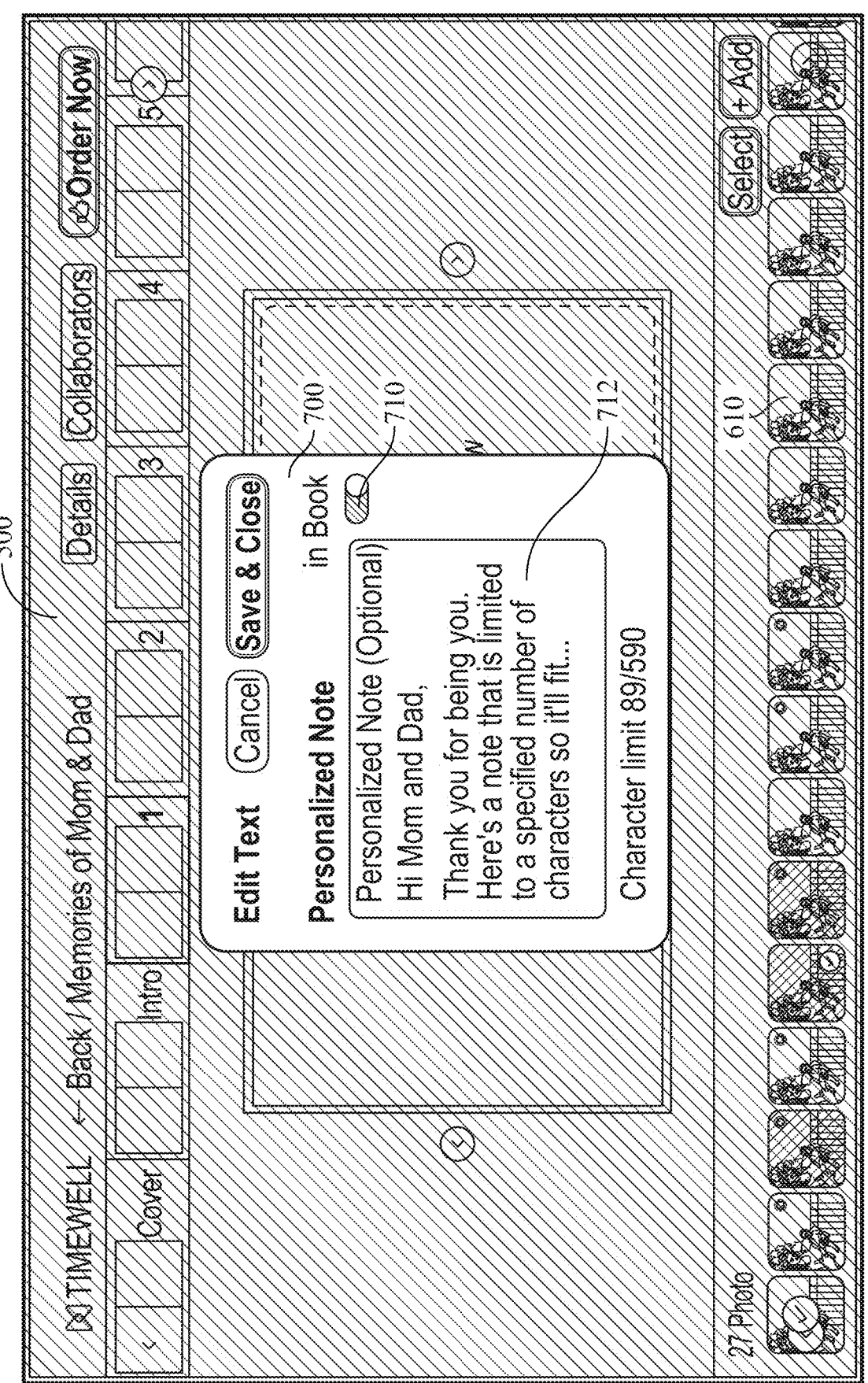
FIG. 7 illustrates a GUI a computing system and an application program, according to some embodiments.

Referring to FIG. 7, an example of a GUI provided to a computing device by the system is shown. The GUI may include the means to add text data 712 to a project via an edit text function 700, including enabling or toggling 710 of inclusion of the added text data 712 in a printed form of the project. Toggling 710 may enable or disable either the printing of text data in a printed form of the project, or enabling display of the text data on a computing device when the QR code associated with said text data is read.

Figure 8:
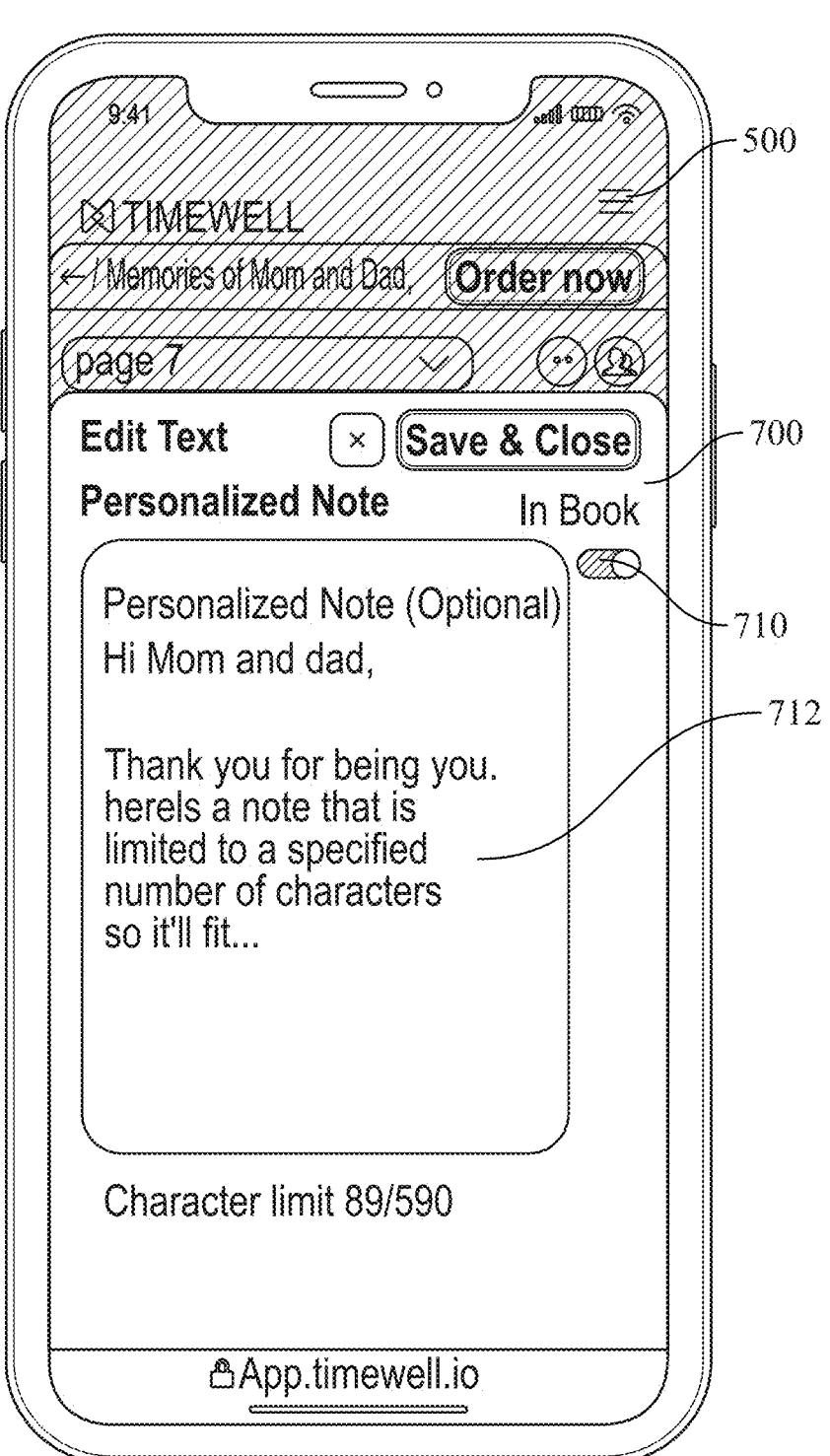
FIG. 8 illustrates a GUI a computing system and an application program, according to some embodiments.

Referring to FIG. 8, an example of a GUI provided to a computing device by the system is shown. The GUI 500 is depicted in use on a computing device such as a smart phone and depicts the same subject matter depicted in FIG. 7. It should be understood that the GUI may take many forms and arrangements and may be adaptable to the type of display or computing device being used by a user.

Referring to FIG. 9, an example of a GUI provided to a computing device by the system is shown. The GUI 500 may provide a means for project 504 creation and editing 906 including preparing of a book including multiple pages 602A, 602B. Uploaded images 610 may be sorted. filtered, and arranged within a project or book via drag-and-drop functionality. Uploaded images 610 may be arranged in a photo album style appearance, including image-per-page arrangements or multiple images-per-page. A page image 900 may include associated text 902 and a systematically generated QR code 904 linked to a dataset include the page image 900 and text 902. Upon either the arrangement of the image 900 or associated text 902 may instruct the system to systematically generate QR code 904 linked to a dataset include the page image 900 and text 902. Datasets may be page based or multi-page based. The GUI 500 may provide editing functionality 906 of any or all pages. Pages 602A, 602B within a project may be arranged as desired with editing tools 910, 920.

Referring to FIG. 10, an example of a GUI provided to a computing device by the system is shown. The GUI 500 may provide a means for project 504 creation and editing 906 including preparing of a book including multiple pages 602A, 602B. Uploaded images 610 may be sorted. filtered, and arranged within a project or book via drag-and-drop functionality. Uploaded images 610 may be arranged in a photo album style appearance, including image-per-page arrangements or multiple images-per-page. A page image 900A, 900B may include associated text 902A, 902B and a systematically generated QR code 904A, 904B linked to a dataset include the page image 900A, 900B and text 902A, 902B. Upon either the arrangement of the image 900A, 900B or associated text 902A, 902B may instruct the system to systematically generate QR code 904A, 904A linked to a dataset include the page image 900A, 900B and text 902A, 902B. Datasets may be page based or multi-page based. The GUI 500 may provide editing functionality 906A of any or all pages. Pages 602A, 602B within a project may be arranged as desired with editing tools 910, 920.

Figure 11:
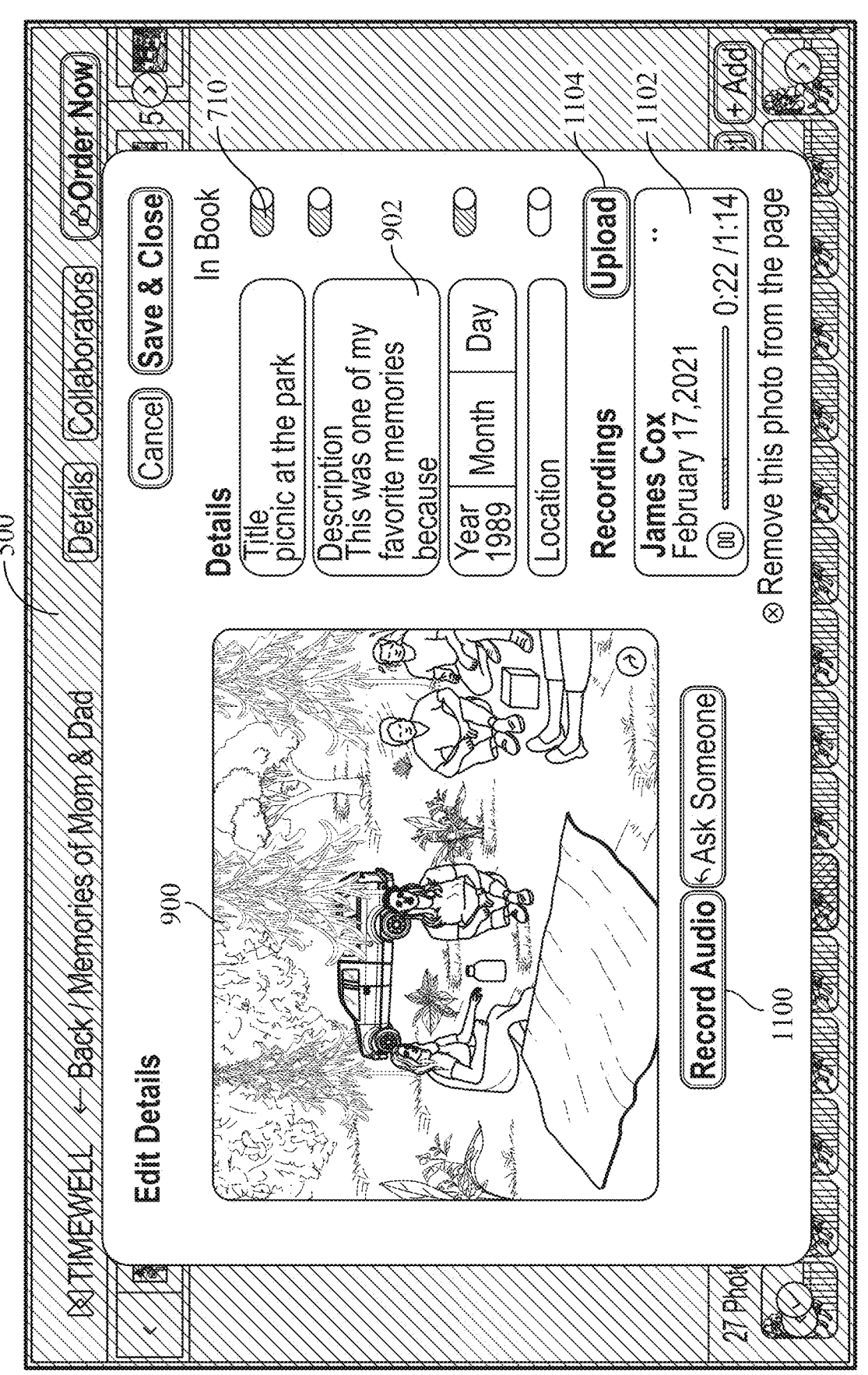
FIG. 11 illustrates a GUI a computing system and an application program, according to some embodiments.

Referring to FIG. 11, an example of a GUI provided to a computing device by the system is shown. The GUI may include the means to record media 1100, such as recorded dialog 1102, and upload 1104 the recorded media 1102 to a system database. The recorded media 1102 may be inserted into a data set with a corresponding image 900 and text data 902. The GUI 500 may include enabling or toggling 710 of inclusion of the added text data 902 in a printed form of the project. Toggling 710 may enable or disable either the printing of text data in a printed form of the project, or enabling display of the text data on a computing device when the QR code associated with said text data is read.

Figure 12:
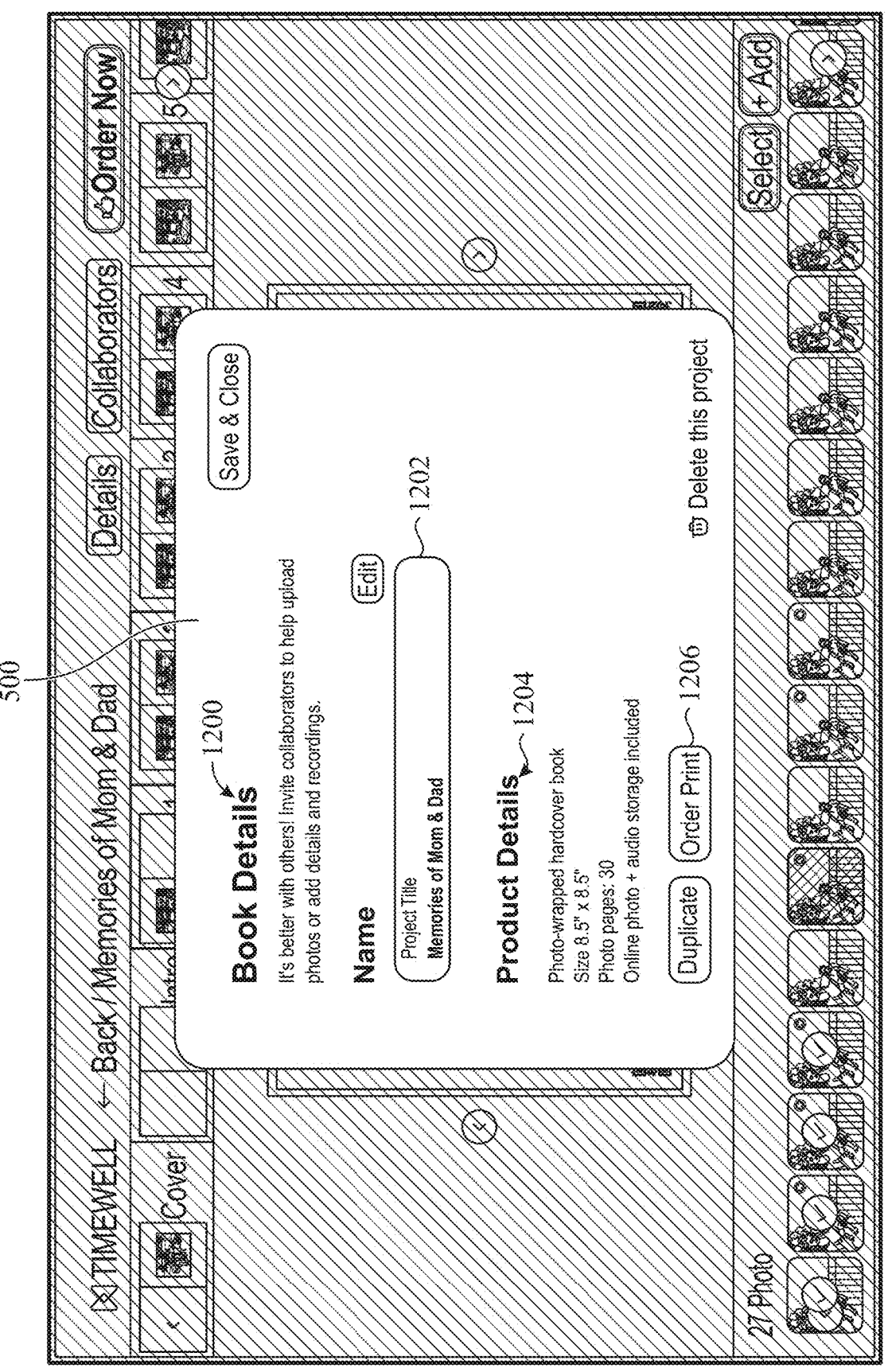
FIG. 12 illustrates a GUI a computing system and an application program, according to some embodiments.

Referring to FIG. 12, an example of a GUI provided to a computing device by the system is shown. The GUI 500 may include book or project detail 1200 editing including project naming 1202 and print project details 1204 such as page count, print size, hardcover or softcover options, and image, text, audio, video, or media and QR code data storage and management. The GUI 500 may provide a means for ordering print copies 1206 of the project or book.

Figure 13:
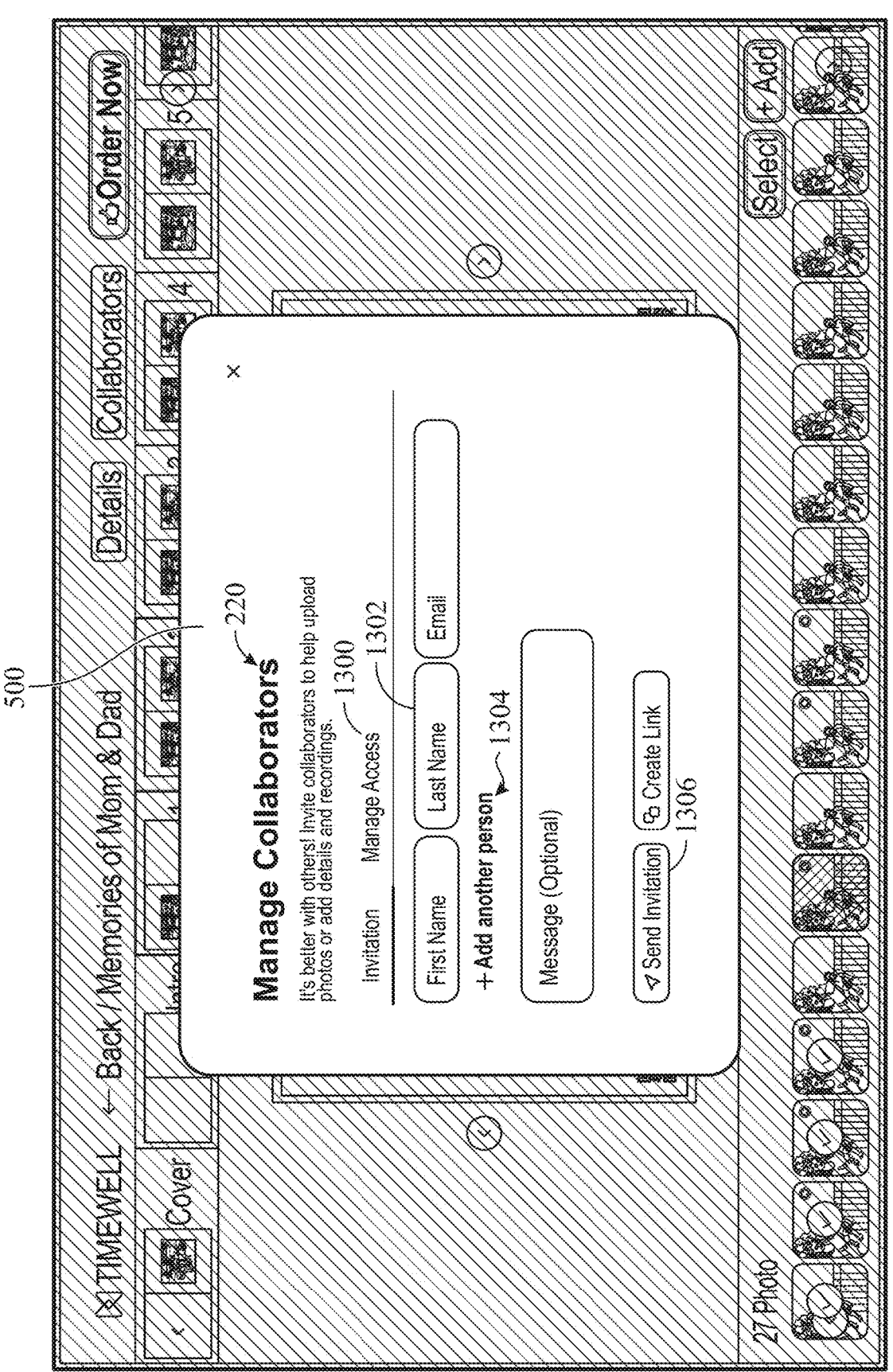
FIG. 13 illustrates a GUI, a computing system and an application program, according to some embodiments.

Referring to FIG. 13, an example of a GUI provided to a computing device by the system is shown. The GUI 500 may include an interface with the user module to facilitate the creation of a user account for the application system. The user module 212 may permit for primary and collaborator users and management 220 of the same. User management 220 may include system or project access management 1300 including invitation 1306 of multiple collaborator users 1304 via collaborator name data, contact info, and the like.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a system for enabling media recording playback via QR code, may include storing at least one image in a database; storing at least one media recording in the database, the at least one media recording being associated with the at least one image; inserting the at least one image and the at least one media recording into a first dataset; generating at least one QR code unique to the first dataset; and instructing, upon reading the at least one QR code, a computing device to initiate media playback of the at least one media recording on the computing device.

Variation 2 may include a system for enabling media recording playback via QR code as in variation 1, including wherein the at least one image is an image in a printed document.

Variation 3 may include a system for enabling media recording playback via QR code as in variation 1 or 2, wherein the at least one image is an image in a digital document.

Variation 4 may include a system for enabling media recording playback via QR code as in any of variations 1 through 3, wherein the at least one image is an image in a printed document and the QR code is in the printed document.

Variation 5 may include a system for enabling media recording playback via QR code as in any of variations 1 through 4, further including instructing, upon reading the at least one QR code, a computing device to display the at least one image on a display of the computing device.

Variation 6 may include a system for enabling media recording playback via QR code as in any of variations 1 through 5, further including storing at least one text data in the database; and inserting the at least one text data, the at least one image, and the at least one media recording into a first dataset.

Variation 7 may include a system for enabling media recording playback via QR code as in any of variations 1 through 6, further including instructing, upon reading the at least one QR code, a computing device to display the at least one text data on a display of the computing device.

Variation 8 may include a system for enabling media recording playback via QR code as in any of variations 1 through 7, further including instructing, upon reading the at least one QR code, a computing device to display the at least one text data and the at least one image on a display of the computing device; and instructing, upon reading the at least one QR code, the computing device to initiate media playback of the at least one media recording on the computing device.

Variation 9 may include a system for enabling media recording playback via QR code as in any of variations 1 through 8, further including storing at least one second image in a database; storing at least one media second recording in the database, the at least one second media recording being associated with the at least one second image; inserting the at least one second image and the at least one second media recording into a second dataset; generating at least one second QR code unique to the second dataset; and instructing, upon reading the at least one second QR code, a computing device to initiate media playback of the at least one second media recording on the computing device.

Variation 10 may include a system for enabling media recording playback via QR code as in any of variations 1 through 9, further including initiating media playback of the at least one media recording on the computing device.

According to variation 11, a software platform may include at least one computing device in operable connection with a network; a memory that stores computer-executable components; a processor that executes a computer program product including computer-executable components stored in the memory, wherein the computer-executable components including storing a plurality of data sets in a database, each data set within the plurality of datasets including at least one image data and at least one media recording data; generating at least one QR code unique to each data set in the plurality of data sets; and instructing, upon reading the at least one QR code via a computing device, the computing device to initiate media playback of the at least one media recording on the computing device.

Variation 12 may include software platform as in variation 11, further including generating a webpage containing the at least one image; and instructing, upon reading the at least one QR code via a computing device, the computing device to display the webpage on a display of the computing device.

Variation 13 may include software platform as in variation 11 or 12, wherein the at least one image is an image in a printed document and the at least one QR code is in the printed document.

Variation 14 may include software platform as in any of variations 11 through 13, further including instructing, upon reading the at least one QR code, a computing device to display the at least one image on a display of the computing device.

Variation 15 may include software platform as in any of variations 11 through 14, further including storing at least one text data in the database; and inserting the at least one text data, the at least one image, and the at least one media recording into a first dataset.

Variation 16 may include software platform as in any of variations 11 through 15, further including instructing, upon reading the at least one QR code, a computing device to display the at least one text data on a display of the computing device.

Variation 17 may include software platform as in any of variations 11 through 13, further including instructing, upon reading the at least one QR code, a computing device to display the at least one text data and the at least one image on a display of the computing device; and instructing, upon reading the at least one QR code, the computing device to initiate media playback of the at least one media recording on the computing device.

Variation 18 may include software platform as in any of variations 11 through 17, further including storing at least one second image in a database; storing at least one media second recording in the database, the at least one second media recording being associated with the at least one second image; inserting the at least one second image and the at least one second media recording into a second dataset; generating at least one second QR code unique to the second dataset; and instructing, upon reading the at least one second QR code, a computing device to initiate media playback of the at least one second media recording on the computing device.

Variation 19 may include software platform as in any of variations 11 through 18, further including initiating media playback of the at least one media recording on the computing device.

According to variation 20, a software platform may include at least one computing device in operable connection with a network; a memory that stores computer-executable components; a processor that executes a computer program product including computer-executable components stored in the memory, wherein the computer-executable components including storing a plurality of data sets in a database on a server in operable communication with the network, each data set within the plurality of datasets including at least one image data, at least one text data, and at least one media recording data; generating at least one QR code unique to each data set in the plurality of data sets; instructing, upon reading the at least one QR code via the at least one computing device, the at least one computing device to initiate media playback of the at least one media recording on the at least one computing device; and instructing, upon reading the at least one QR code via a computing device, the at least one computing device to display the at least one image data and the at least one text data on a display of the at least one computing device.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. As used herein, the terms "computer program product," "application program," "application software," or "software" or variations on those terms refer to software including sets of computer executable code or programs and associated software documentation and related data. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system for enabling media recording playback via QR code, comprising:
    storing at least one image in a database;
    storing at least one media recording in the database, the at least one media recording being associated with the at least one image;
    inserting the at least one image and the at least one media recording into a first dataset corresponding to a print layout of a print surface of a printed product, wherein the printed product comprises at least one of a greeting card, a postcard, a print, a plaque, an album page, a framed photo, a brochure, a product catalog, or a book, and wherein the print layout defines a panel of the printed product configured for printing the at least one image on the print surface;
    generating at least one QR code unique to the first dataset, the at least one QR code being configured for placement on the same print surface of the printed product as a printed instance of the at least one image; and
    instructing, upon reading the at least one QR code, a computing device to scan the at least one QR code via a camera of the computing device, transmit a tag extracted from the QR code to a server, retrieve the first dataset from the database in response to the tag, render, via a web browser on the computing device, the retrieved image and media content in a layout corresponding to the print layout of the printed product, and initiate synchronized media playback of the at least one media recording on the computing device while the layout corresponding to the print layout is displayed.

2. A system for enabling media recording playback via QR code as in claim 1, wherein the at least one image is an image in a printed document.

3. A system for enabling media recording playback via QR code as in claim 1, wherein the at least one image is an image in a digital document.

4. A system for enabling media recording playback via QR code as in claim 1, wherein the at least one image is an image in a printed document and the QR code is in the printed document.

5. A system for enabling media recording playback via QR code as in claim 1, further comprising instructing, upon reading the at least one QR code, a computing device to display the at least one image on a display of the computing device.

6. A system for enabling media recording playback via QR code as in claim 1, further comprising:
    storing at least one text data in the database; and inserting the at least one text data, the at least one image, and the at least one media recording into a first dataset.

7. A system for enabling media recording playback via QR code as in claim 6, further comprising instructing, upon reading the at least one QR code, a computing device to display the at least one text data on a display of the computing device.

8. A system for enabling media recording playback via QR code as in claim 6, further comprising:

instructing, upon reading the at least one QR code, a computing device to display the at least one text data and the at least one image on a display of the computing device; and instructing, upon reading the at least one QR code, the computing device to initiate media playback of the at least one media recording on the computing device.

9. A system for enabling media recording playback via QR code as in claim 8, further comprising:

storing at least one second image in the database;

storing at least one second media recording in the database, the at least one second media recording being associated with the at least one second image;

inserting the at least one second image and the at least one second media recording into a second dataset;

generating at least one second QR code unique to the second dataset; and instructing, upon reading the at least one second QR code, a computing device to initiate media playback of the at least one second media recording on the computing device.

10. A system for enabling media recording playback via QR code as in claim 1, further comprising initiating media playback of the at least one media recording on the computing device.

11. A software platform comprising:

at least one computing device in operable connection with a network;

a memory that stores computer-executable components;

a processor that executes a computer program product comprising computer-executable components stored in the memory, wherein the computer-executable components comprising:

storing a plurality of data sets in a database, each data set within the plurality of datasets comprising at least one image data and at least one media recording data, each data set corresponding to a print layout of a print surface of a printed product that includes the at least one image data, wherein the printed product comprises at least one of a greeting card, a postcard, a print, a plaque, an album page, a framed photo, a brochure, a product catalog, or a book;

generating at least one QR code unique to each data set in the plurality of data sets, each QR code being configured for placement on the same print surface of the printed product as a printed instance of the at least one image data; and instructing, upon reading the at least one QR code via a computing device, the computing device to scan the at least one QR code via a camera of the computing device, transmit a tag extracted from the QR code to a server, retrieve a first dataset from the database in response to the tag, render, via a web browser on the computing device, the retrieved image and media content in a layout corresponding to the print layout of the printed product, and initiate synchronized media playback of the at least one media recording on the computing device while the layout corresponding to the print layout is displayed.

12. A software platform as in claim 11, further comprising:

generating a webpage containing the at least one image; and instructing, upon reading the at least one QR code via a computing device, the computing device to display the webpage on a display of the computing device.

13. A software platform as in claim 11, wherein the at least one image is an image in a printed document and the at least one QR code is in the printed document.

14. A software platform as in claim 11, further comprising instructing, upon reading the at least one QR code, a computing device to display the at least one image on a display of the computing device.

15. A software platform as in claim 11, further comprising:

storing at least one text data in the database; and inserting the at least one text data, the at least one image, and the at least one media recording into a first dataset.

16. A software platform as in claim 15, further comprising instructing, upon reading the at least one QR code, a computing device to display the at least one text data on a display of the computing device.

17. A software platform as in claim 15, further comprising:

instructing, upon reading the at least one QR code, a computing device to display the at least one text data and the at least one image on a display of the computing device; and instructing, upon reading the at least one QR code, the computing device to initiate media playback of the at least one media recording on the computing device.

18. A software platform as in claim 17, further comprising:

storing at least one second image in the database;

storing at least one second media recording in the database, the at least one second media recording being associated with the at least one second image;

inserting the at least one second image and the at least one second media recording into a second dataset; generating at least one second QR code unique to the second dataset; and instructing, upon reading the at least one second QR code, a computing device to initiate media playback of the at least one second media recording on the computing device.

19. A software platform as in claim 18, further comprising initiating media playback of the at least one media recording on the computing device.

20. A software platform comprising:

a database engine configured to store and manage multimedia content, the multimedia content comprising:

at least one image stored in the database;

at least one media recording stored in the database, the at least one media recording being associated with the at least one image;

a QR module operatively coupled to the database engine, the QR module configured to:

generate a first dataset comprising the at least one image and the at least one media recording corresponding to a print layout of a print surface of a printed product, wherein the printed product comprises at least one of a greeting card, a postcard, a print, a plaque, an album page, a framed photo, a brochure, a product catalog, or a book;

generate at least one QR code uniquely associated with the first dataset, the QR code comprising a tag identifying the dataset location in the database, the at least one QR code configured for placement on the same print surface of the printed product as a printed instance of the at least one image;

a media module configured to associate the at least one media recording with the tag and to manage media streaming or playback requests initiated by a computing device; and a computing device in operable communication with the system via a network, the computing device comprising a camera, a display, and a speaker, the computing device configured to:

scan the at least one QR code using the camera;

transmit the tag extracted from the QR code to the system;

receive the first dataset from the database in response to the tag;

render, via a web browser on the computing device, the at least one image from the first dataset on the display in a layout corresponding to the print layout of the printed product; and initiate media playback of the at least one media recording from the first dataset via the speaker while the layout corresponding to the print layout of the printed product is displayed.

* * * * *